United States Patent
Kuhnen et al.

(10) Patent No.: US 7,669,368 B2
(45) Date of Patent: Mar. 2, 2010

(54) SLIDING DOOR FOR MOTOR VEHICLES AND METHOD FOR THE ASSEMBLY THEREOF

(75) Inventors: Thorsten Kuhnen, Kitzingen (DE); Patricia Cruz, Bamberg (DE); Arnd Herwig, Baunach (DE); Olaf Kriese, Coburg (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 614 days.

(21) Appl. No.: 10/586,514

(22) PCT Filed: Oct. 19, 2005

(86) PCT No.: PCT/EP2005/055363

§ 371 (c)(1),
(2), (4) Date: Jul. 18, 2006

(87) PCT Pub. No.: WO2006/061285

PCT Pub. Date: Jun. 15, 2006

(65) Prior Publication Data

US 2007/0157523 A1    Jul. 12, 2007

(30) Foreign Application Priority Data

Dec. 6, 2004    (DE) .................. 10 2004 058 870

(51) Int. Cl.
*E05F 11/00* (2006.01)
(52) U.S. Cl. ............................. 49/360; 49/502; 296/155
(58) Field of Classification Search .................. 49/360, 49/502; 296/155
See application file for complete search history.

(56) References Cited

U.S. PATENT DOCUMENTS 5,584,144 A * 12/1996 Hisano .................... 49/502

(Continued)

FOREIGN PATENT DOCUMENTS

DE    199 05 022    1/1999

(Continued)

OTHER PUBLICATIONS

International Search Report, International Application No. PCT/EP2005/055363, Feb. 1, 2006.

(Continued)

*Primary Examiner*—Katherine W Mitchell
*Assistant Examiner*—Jeff Tang
(74) *Attorney, Agent, or Firm*—Renner, Otto, Boisselle & Sklar, LLP

(57) ABSTRACT

Sliding door for motor vehicles, having an outer door skin, an inner door skin and a door inside trim, supported on a guide rail on a vehicle body and movable between opened and closed positions. The sliding door includes a cable guide assembly for accommodating and guiding electric cables, which connect first electric elements provided in or on the vehicle body to second electric elements provided on the sliding door, whereby on moving the sliding door, the cable guide assembly is movable in a plane including the longitudinal direction of the vehicle and whereby a guide channel for guiding the cable guide assembly is provided on moving the sliding door. Guide surfaces of the guide channel are formed or integrated at least in sections on the inner door skin, in a door module support and/or on the door inside trim.

22 Claims, 6 Drawing Sheets

U.S. PATENT DOCUMENTS

| | | | |
|---|---|---|---|
| 6,494,523 B2* | 12/2002 | Kobayashi | 296/155 |
| 6,575,760 B2 | 6/2003 | Doshita et al. | |
| 6,682,353 B2* | 1/2004 | Bigotto | 439/34 |
| 6,685,253 B1* | 2/2004 | Wolcott | 296/155 |
| 6,781,058 B1* | 8/2004 | DeCicco et al. | 174/72 A |
| 6,919,511 B2* | 7/2005 | Tsunoda et al. | 174/72 A |
| 6,996,967 B2* | 2/2006 | Kobayashi | 59/78.1 |
| 7,082,720 B2* | 8/2006 | Kobayashi et al. | 49/360 |
| 2001/0004022 A1* | 6/2001 | Kobayashi | 174/72 A |
| 2001/0052203 A1* | 12/2001 | Doshita et al. | 49/502 |
| 2002/0005014 A1* | 1/2002 | Doshita et al. | 49/360 |
| 2003/0101656 A1* | 6/2003 | Seksaria et al. | 49/502 |
| 2004/0003543 A1* | 1/2004 | Kobayashi et al. | 49/360 |
| 2004/0083655 A1* | 5/2004 | Suzuki et al. | 49/360 |
| 2004/0084932 A1* | 5/2004 | Suzuki et al. | 296/155 |
| 2007/0107312 A1* | 5/2007 | Wehler | 49/360 |

FOREIGN PATENT DOCUMENTS

| | | |
|---|---|---|
| JP | 10-936 | 6/1998 |
| JP | 2002-2288 | 1/2002 |
| WO | 00/45489 | 8/2000 |

OTHER PUBLICATIONS

German Search Report, Application No. 10 2004 058 870.8, dated Jul. 15, 2005.

* cited by examiner

SLIDING DOOR FOR MOTOR VEHICLES AND METHOD FOR THE ASSEMBLY THEREOF

FIELD OF THE INVENTION

The present invention relates to a sliding door for motor vehicles and a method for the manufacture thereof and especially relates to the transmission of electric power and/or electrical signals between a vehicle electrical system of a vehicle body and a sliding door.

BACKGROUND OF THE INVENTION

Supplying power to a sliding door is relatively complex since, unlike with a rotatably operable hinged door, where common points independent from the door's open condition are automatically specified between the vehicle body and the hinged door, no independent common points are provided between the vehicle body and the door by the door's open condition. There exists, therefore, the need to create an electrical connection between electrical elements located on the sliding door and on the vehicle body, which enable a permanent reliable transmission of voltage and/or signals regardless of the door's open condition.

As is known, sliding doors are heavier than conventional hinged doors. On opening the sliding door, the point of gravity moves backwards in the longitudinal direction of the vehicle, which makes the sliding movement difficult, especially for older or disabled people and especially on uneven ground. Therefore, one endeavors to provide sliding doors with a motor-driven drive mechanism whereby, for production reasons, it may be preferable to house the drive motor for driving the sliding door in the sliding door itself. This requires a reliable, uninterrupted supply of power to the drive motor.

A reliable and uninterrupted supply of power to sliding doors is made difficult by the movement sequence during opening and closing since, as is known, when looked at from the longitudinal direction of the door, the guide rails provided on the top and bottom edge of the door aperture are curved on the front end to enable the sliding door to close substantially flush with the outer skin of the vehicle body in its closed position and so that in its open position it is guided at a distance to the outer skin of the vehicle body. For this purpose, sliding doors are usually pivotably hinged on guide carriages guided by the guide rails so that the sliding door is substantially parallel in all positions to a plane defined by the outer skin of the vehicle body. In addition to a movement in the sliding plane in the longitudinal direction of the vehicle, sliding doors thus execute a movement in a direction transverse to the sliding plane. A cable guide assembly for accommodating and guiding plus protecting the connecting electric cables is necessary so that the electric cables for supplying the sliding door with power do not snag or become caught up. Such cable guide assemblies must be designed so that they can accommodate or compensate the sliding door's sliding movement in the longitudinal direction of the vehicle as well as the sliding door's displacement transverse to the longitudinal direction of the vehicle. Various cable guide concepts are known from the prior art which will be described briefly in the following.

DE 197 17 490 A1 discloses a sliding door which is supplied by a supply cable that is wound onto a cable drum provided with a retraction device, wherein one end of the cable is connected to the drum core of the cable drum supported on the body side and the other end of the cable is connected to the sliding door. There is no provision for compensation of the displacement movement transverse to the longitudinal direction of the vehicle or to the sliding plane.

DE 100 00 930 A1 discloses an arrangement carrying electricity in a sliding door of a motor vehicle, with a guide rail, a sliding block which is accommodated in the guide rail so as to be sliding, and a cable harness that is attached to the sliding block and extends up to the vehicle body, whereby a section of the cable harness is formed in a curve between the sliding block and the body. The U-shaped, curved section of the cable harness spans the gap between the vehicle body and the sliding door, whereby there is no reliable way of preventing the cable harness from snagging.

DE 199 05 022 A1 discloses a sliding door according to the preamble of claim 1. The sliding door is capable of moving between an open position and a closed position in the longitudinal direction of the vehicle and includes a cable guide assembly designed as a cable drag chain in which electric cables are accommodated and guided. The cable drag chain's movement range is limited by a guide box provided in the vehicle's roof liner, in which the cable drag chain is accommodated and guided. The cable drag chain is only movable in a plane substantially coincident with the plane of the roof liner. This cable guiding concept requires additional provisions in the vehicle's roof liner which makes optional assembly of manually operated sliding doors and motor-driven sliding doors costly.

SUMMARY OF THE INVENTION

The object of the present invention is to provide a guide concept such that sliding doors can be assembled in a simple and cost-effective manner to supply power flexibly and customer-specifically.

This object is achieved by a sliding door with the features according to claim 1 and by a method of assembling such a sliding door with the features according to claim 19. Further advantageous embodiments are the subject of the related subclaims.

In a sliding door according to the present invention, guide surfaces of the guide channel are formed or integrated at least in sections on the inner door skin and/or on a door module support capable of being joined to the inner door skin and/or on the door inside trim. It is advantageous to be able to adapt the sliding door easily to the different types of cable guide assemblies. In this regard, the electric cables are accommodated and guided in the cable guide assembly such that the electric cables cannot snag or become entangled when the door is moved. The cable guide assembly for its part is accommodated so as to be movable in an appropriate guide channel which is guided by the cable guide assembly on moving the sliding door to enable compensation of the cable in the sliding plane or in the longitudinal direction of the vehicle and in a direction transverse to the sliding plane.

In a sliding door according to the present invention, the door module support may be provided to accommodate functional components (for example, door lock, airbag module, window lift, loudspeaker) of the sliding door which may be attached on the sliding door together with the functional components pre-assembled on the door module support. In this case, the guide channel for guiding the cable guide assembly may be formed or integrated at least in sections on the door module support.

It is also possible to reduce the assembly effort required for final installation by integrating the cable guide assembly in the door module support because all the elements required for supplying the door with electricity may be pre-assembled and pre-installed and then connected to the sliding door and inserted into the vehicle. If the guide of the cable guide assembly is formed on the door module support, on a side wall thereof for example, it is possible to save on additional elements for forming such a guide structure which leads to a not inconsiderable weight saving in sliding doors.

According to a further embodiment, the cable guide assembly comprises a first and a second section, whereby on moving the sliding door, the first section is only movable in the sliding plane including the longitudinal direction of the vehicle and whereby the second section is formed to be movable, especially pivotable, in a direction transverse to the sliding plane on relocating the sliding door into the sliding plane. Thus there exists a clear functional distinction between the cable compensation in the sliding plane or the longitudinal direction of the vehicle and the cable compensation in a direction transverse to the sliding plane which offers advantages in planning and assembly. Furthermore, it is ensured that the second section, which preferably spans the gap between the sliding door and the vehicle body, does not sag on relocating the sliding door and snag on obstacles projecting into the gap.

According to a further embodiment, the guide channel may be formed as a cavity extending in the longitudinal direction with two side walls parallel to and at a distance from each other, which limit a lateral movement of the cable guide assembly on moving the sliding door. In this regard, lateral surfaces of the cable guide assembly may be in permanent contact with the side walls of the cavity in order to be guided. Preferably, however, the guide channel specifies a slight tolerance of the cable guide assembly so that friction forces are minimized. In this case, at least one side wall limiting the cavity may be formed on the door module support. Thus additional elements for the provision of a guide or of a guide channel for the cable guide assembly are not necessary.

According to a further embodiment, in any position of the sliding door the cable guide assembly forms a substantially C-shaped turning area in which the direction in which the electric cables run is reversed. On moving the sliding door, this C-shaped turning area travels in the longitudinal direction of the vehicle inside the associated guide section. Thus the guide channel also fulfills a guiding function in order to limit the movement range of the C-shaped turning area on moving the sliding door. To reduce the friction forces in the completely open position and in the completely closed position of the sliding door, it is possible to provide that the C-shaped turning area is disposed outside the guide or in a widened end area of the guide channel in these sliding door positions.

According to a further embodiment, the guide channel may comprise a top or first section for guiding the cable guide assembly in a first direction and a bottom or second section for guiding the cable guide assembly in a second, opposing direction. Between these guide sections, each of which is formed as an oblong cavity, is preferably provided a cross-sectional constriction of the cavity, for example in the shape of side walls, beads, protrusions and similar, which project into the guide channel whereby the C-shaped turning area can pass along over this cross-sectional constriction when the sliding door is moved.

According to a further embodiment, the guide or guide channel also includes a sliding element guide for guiding a sliding element which is connected to the cable guide assembly or is formed on it. The sliding element guide is preferably designed to guide the movement of the cable guide assembly in the longitudinal direction of the vehicle and to prevent a lateral evasive movement in a direction perpendicular to the longitudinal direction of the vehicle. This enables a separation of function in such a way that a first section of the cable guide assembly is exclusively responsible for compensating the displacement movement in the sliding plane parallel to the longitudinal direction of the vehicle, whilst a second section of the cable guide assembly is exclusively responsible for compensating movements of the cable guide assembly in a direction transverse to the sliding plane. Both sections of the cable guide assembly may be provided with cable guide elements formed to correspond with or differ from each other. For example, as is explained in greater detail in the following, the cable guide assembly responsible for compensation in the sliding plane may be formed as a cable drag chain, whilst the second cable guide assembly responsible for compensation in a direction transverse to the sliding plane may be designed as a flexible cable harness, also as a flexible cable duct or similar. This separation of function enables an even more flexible and cost-effective cable guiding concept.

According to a further embodiment, a pivot bearing may be formed or attached on the sliding element, on which bearing a second section of the cable guide assembly is pivotably supported. On moving the sliding door, the second section thus executes a pivoting movement around an axis perpendicular to the longitudinal direction of the vehicle whereby it may be provided that the length of the cable guide assembly's second section does not change on pivoting.

According to the invention, the guide may be formed between the door module support and an inner door skin or a door inside trim of the sliding door.

In the method according to the invention for assembly of the sliding door, the outer door skin, the inner door skin and the door inside trim are provided such that on installation of the sliding door guide surfaces of the guide channel are formed or integrated at least in sections on the inner door skin and/or on a door module support capable of being joined to the inner door skin and/or on the door inside trim in order to automatically form the guide channel on installation of the sliding door. Thus it is possible to dispense with additional assembly expenditure for the provision or formation of the guide channel for guiding the cable guide assembly.

In this regard, initially a pre-assembled cable guide assembly may be mounted on a door module support and the door module support may then be fixed together with the functional units attached to it and the cable guide assembly to the sliding door such that the guide channel for guiding the cable guide assembly is formed automatically on moving the sliding door.

OVERVIEW OF FIGURES

The invention will be described in the following in an exemplary manner with reference to the accompanying drawings from which will emerge further features, advantages and objects to be achieved, and wherein.

Identical reference numerals in the figures relate to identical elements or element groups or those which are substantially identical or equivalent in function.

DETAILED DESCRIPTION OF PREFERRED EMBODIMENTS

Figure 1:
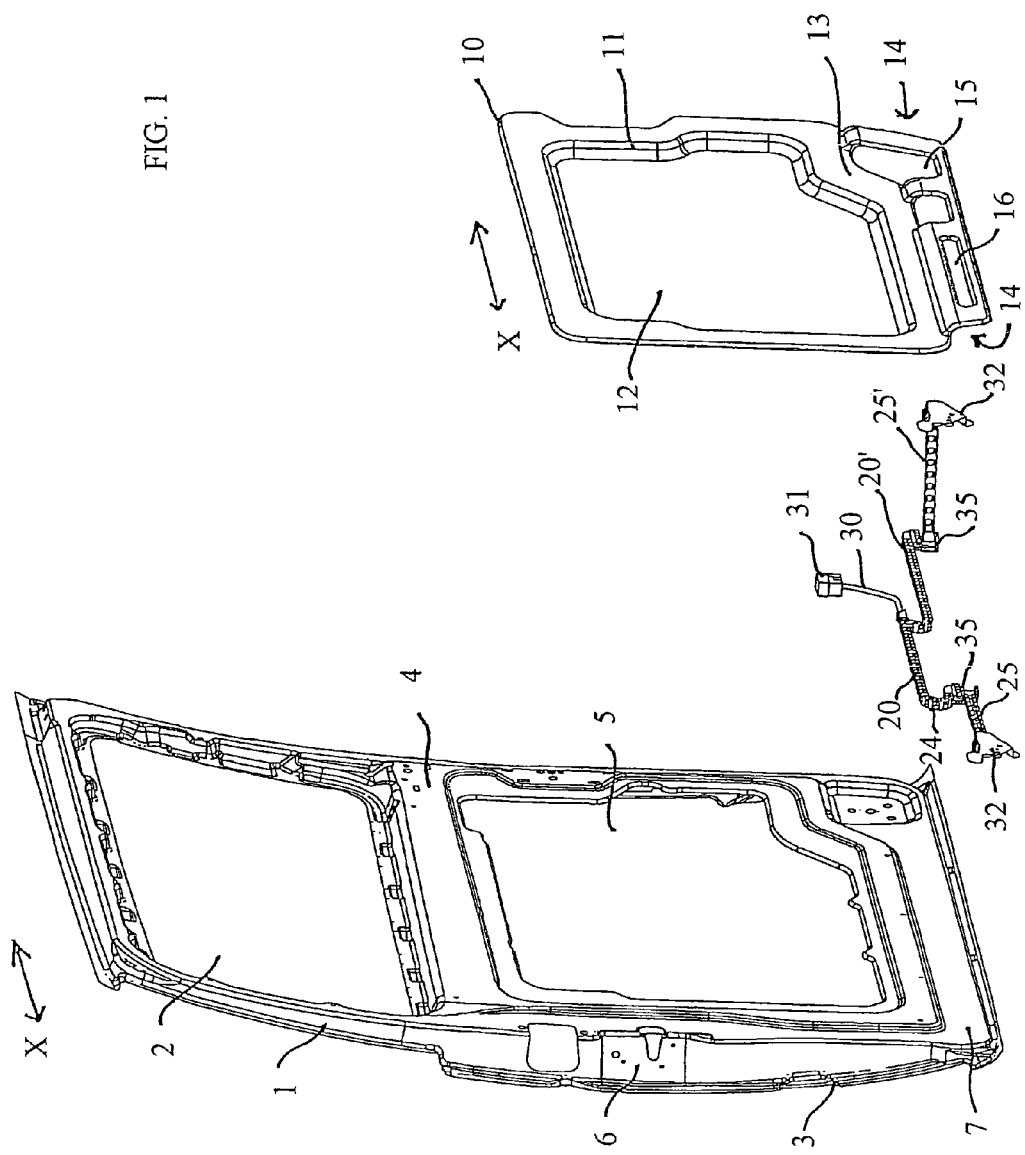
FIG. 1 shows a perspective exploded view of a sliding door with a cable guide assembly and a door module support according to the present invention.

The left-hand part of FIG. 1 shows sliding door 1 that is formed by an outer door skin 3, which has a convex outward curve, and an inner door skin 4 and has a window aperture 2. The direction of movement extending parallel to the longitudinal direction of the vehicle is designated in the following by the double arrow x. On the rear face end of sliding door 1 is provided a door lock assembly 6. Inner door skin 4 forms a circumferential border which encloses a cavity 5 in sliding door 1, for example for lowering the window or for accommodating components. Sliding door 1 is supported in the known manner by means of articulated joints on guide rails which extend along the top and bottom edge of the vehicle's door aperture (not shown).

The right-hand part of FIG. 1 shows a plate-shaped door module support 10 which serves to accommodate a plurality of the sliding door's functional units. These functional units may be pre-assembled on door module support 10 prior to its installation in the sliding door and may be tested in the pre-assembled condition so that door module support 10 together with the functional units attached thereto can be inserted into the sliding door as a completely pre-fabricated and pre-tested door module. Examples of such functional units are cable harnesses, loudspeaker of an audio unit, a drive motor for an electric window lift for example, and an airbag module. In addition, a motor-driven window lift may be attached as a further functional unit to door module support 10.

Figure 5B:
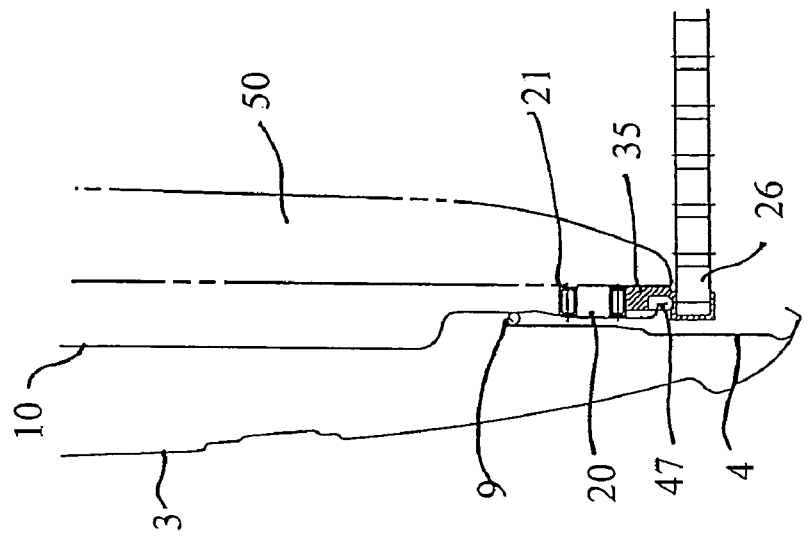
FIG. 5b shows a sliding door according to a second embodiment of the present invention in a schematic view along the line A-A according to FIG. 4.
Figure 5A:
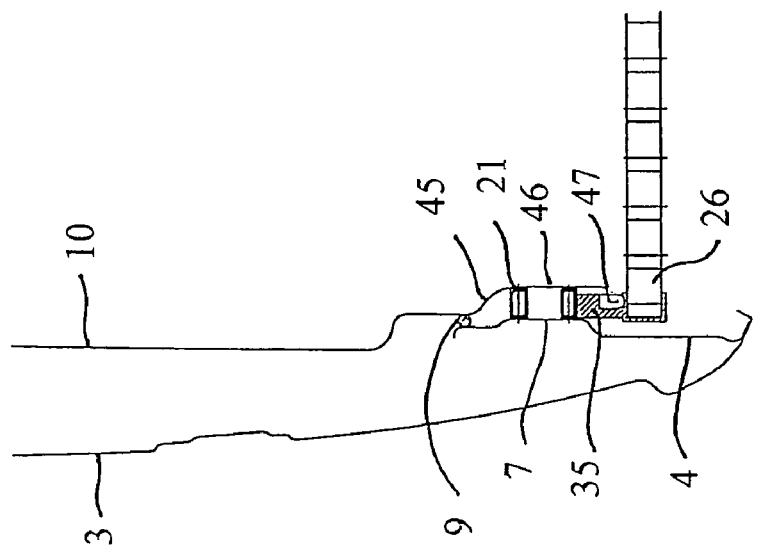
FIG. 5a shows a sliding door according to a first embodiment of the present invention in a schematic view along the line A-A according to FIG. 4.

According to FIG. 1, door module support 10 comprises a circumferential seal area for clamping a circumferential seal against inner door skin 4 (cf. reference numeral 9 in FIGS. 5*a* and 5*b*). Flat functional element carrier 12 is formed so as to be recessed to the circumferential seal area. On bottom edge 13 of door module support 10 is formed a guide area 14 for guiding cable drag chains acting as a cable guide assembly which will be explained in greater detail in the following. Guide area 14 may be formed by bending over bottom edge area 13 of door module support 10 or may be connected subsequently thereto, for example by welding or bolting. According to FIG. 1, guide area 14 includes a plurality of stamped or blanked out areas 15, 16, which project outwards from the door from the rear of bottom edge area 13 or are cut out of bottom edge area 13 in order to save weight. Door module support 10 is attached onto sliding door 1 for assembly such that recessed, flat functional element carrier 12 is fitted into associated cut-out 5 and is preferably attached to inner door skin 4 by bolting. In this case bottom guide wall 7 of inner door skin 4 and guide area 14 of door module support 10 automatically form a cavity extending in the longitudinal direction, which acts as a guide channel to accommodate and guide the cable guide assembly shown in the central part of FIG. 1.

As defined by the present application, the cable guide assembly holds the majority of electric connecting cables together such that they execute a coordinated compensating movement on displacing the sliding door into the sliding plane (that is during the initial phase of opening the door aperture) and on moving the sliding door in the sliding plane. In this regard the cable guide assembly serves simultaneously as mechanical protection of the electric connecting cables, for example against wear of the cable sheaths due to friction or against snagging of the electric connecting cables.

According to FIG. 1, the cable guide assembly comprises a top cable drag chain 20 movable in longitudinal direction x and a bottom cable drag chain 25, which can be pivoted round an articulated joint around a substantially vertical pivot axis transverse to the longitudinal direction of the vehicle. In cable drag chains 20, 25 are accommodated and guided electrical connecting cables (not shown) which are guided out at the rear end of bottom cable drag chain 25 and at the front end of top cable drag chain 20. At the rear end of bottom cable drag chain 25 is an interface element 32 on the vehicle body side for connection to the vehicle's on-board electrics. The electric cables exiting from the front end of top cable drag chain 20 are combined into a connecting cable 30 or are encased in a corrugated tube or similar and connect to a connecting plug 31 which may be attached on the sliding door, preferably on door module support 10. The electrical connection thus created serves to supply electricity to functional units of sliding door 1, as explained previously, and for exchanging signals between the vehicle body and the sliding door.

For reasons of clarity, the cable guide assembly is always shown in the drawings in a configuration corresponding to the foremost position of the sliding door (reference numerals without apostrophe) and in a configuration corresponding to a completely opened (rearmost) position of the sliding door (reference numerals with apostrophe). According to FIG. 1, in the completely closed position of the sliding door top cable drag chain 20 and bottom cable drag chain 25 are aligned in the longitudinal direction of the vehicle, whilst in the completely closed position of the sliding door bottom cable drag chain 25' is pivoted substantially at right angles towards the inside of the vehicle. In the opened positions of the sliding door, the gap between the vehicle body and the sliding door is spanned by bottom cable drag chain 25 which thus serves as a cable compensation transverse to the longitudinal direction of the vehicle. Sliding door 1 is supported and guided on curved guide rails in the known manner. Thus sliding door 1 is moved or pivoted in a direction transverse to the sliding plane in the initial phase of opening the door aperture, and moved in the sliding plane during the further phases of opening the door aperture.

Figure 2:
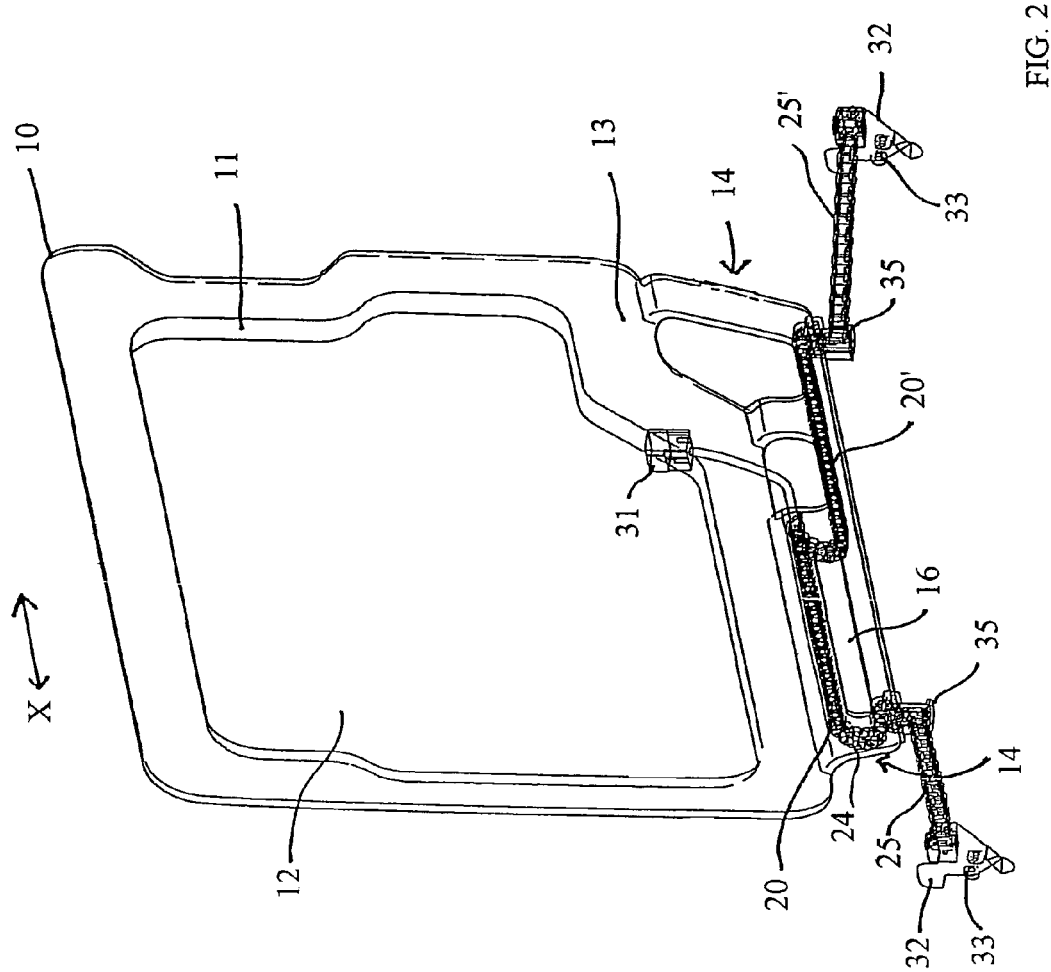
FIG. 2 shows an enlarged view of the door module support according to FIG. 1.

The guide channel formed by bottom guide wall 7 and guide area 14 has the shape of an oblong cavity and is formed in the installed condition of the sliding door such that the cable guide assembly formed by cable drag chains 20, 25 and pivot bearing 35 is accommodated and guided therein on moving the sliding door. This can be seen more clearly in FIG. 2, according to which bottom cable drag chain 25, 25' is provided underneath the bottom edge of guide channel 14 in every position of the sliding door with the result that bottom cable drag chain 25, 25' can be pivoted unhampered on moving the sliding door, especially so that it is not obstructed when pivoting transverse to the sliding plane of sliding door 1. According to FIG. 2, top cable drag chain 20 forms a C-shaped turning area in every position of the sliding door, in which the running direction of the electric cables accommodated therein is reversed. According to FIG. 2, the guide channel has an oblong side wall 16 formed, for example, by stamping, which projects from the rear of guide area 14 and extends into the guide channel. In the completely closed position of the sliding door, C-shaped turning area 24 is located outside the area of side wall 16. On further opening of the sliding door, C-shaped turning area 24 passes over side wall 16. To reduce the play of top cable drag chain 20, provision may be made so that, on moving the sliding door, the chain links of cable drag chain 20 lie in contact with side wall 16 and with parallel guide wall 7 (cf. FIG. 1) of the inner door skin.

According to a further embodiment (not shown), the side wall is flat and formed so as to be aligned with the side walls of top 17 and bottom 18 guide sections. According to a further embodiment (not shown), it is also possible to provide a cut-out in the side wall of bottom guide area 14 in the vicinity of side wall 16 shown in FIG. 2.

The electric cables exiting from the rear end of top cable drag chain 20 may be guided through pivot bearing 35 and routed into bottom cable drag chain 25. Naturally, in the vicinity of pivot bearing 35 it is also possible to provide a connecting device, for example a connecting plug, to connect the electric cables guided in top cable drag chain 20 with the electric cables guided in bottom cable drag chain 25.

Figure 3:
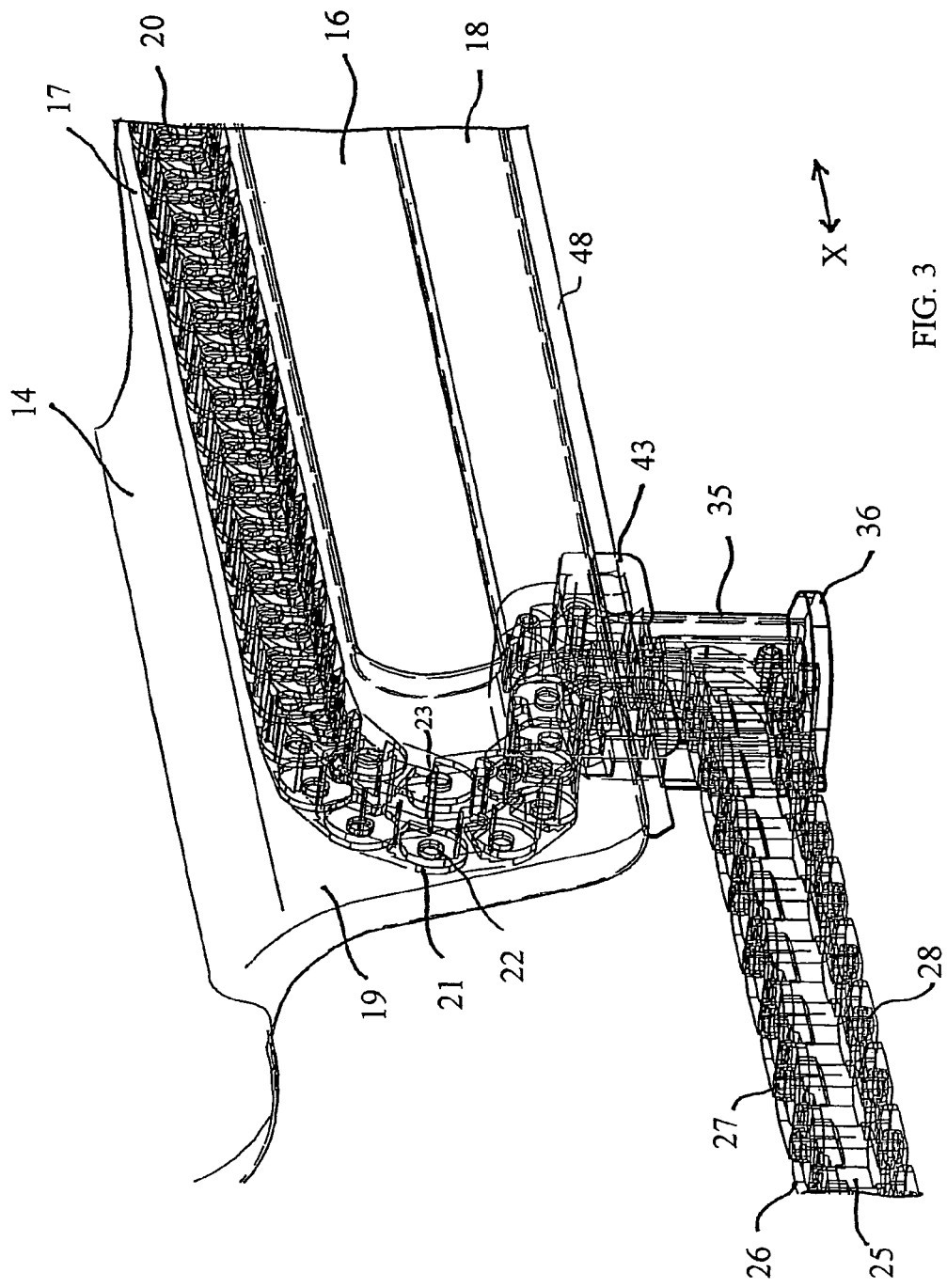
FIG. 3 shows an enlarged view of the front end or turning area of the top cable guide assembly according to FIG. 2.

FIG. 3 shows guiding of top cable drag chain 20 in an enlarged view. According to FIG. 3, a top guide section 17 and a bottom guide section 18 are above and below oblong side wall 16. Top guide section 17 is formed such that the top run of cable drag chain 20 is guided within it. Bottom guide channel 18 is formed such that the bottom run of cable drag chain 20 is guided within it. Top cable drag chain 20 consists of a large numeral of chain links 21, which at one end have two opposing, round connecting protrusions 22 projecting inwards that engage in an aperture formed at the other end of an adjacent chain link 21. Thus cable drag chain 20 is substantially only movable in one plane within guide channel 14, said plane including longitudinal direction of the vehicle x and being parallel to the sliding plane of sliding door 1 or including said plane. Bottom cable drag chain 25 is correspondingly formed from a large numeral of chain links 26 with connecting protrusions 27 and receiving apertures 28. According to FIG. 3, chain links 26 of bottom cable drag chain 25 are aligned vertically to chain links 21 of top cable drag chain 20. Thus bottom cable drag chain 25 is substantially incapable of movement in the plane referred to above. However, bottom cable drag chain 25 is movable in the direction transverse to the vehicle.

According to FIG. 3, formed on the bottom edge of guide channel 14 is a guide flange 48 extending in longitudinal direction of the vehicle x which engages in a slot of sliding element 43, which is formed on the articulated joint or pivot bearing or is connected thereto. Sliding element 43 thus automatically determines the movement of the rear end of top cable drag chain 20 and of the articulated joint or pivot bearing on moving the sliding door. The pivot movement transverse to the longitudinal direction of the vehicle executed at the same time by bottom cable drag chain 25 is determined in this case by the displacement movement of the sliding door.

Figure 6:
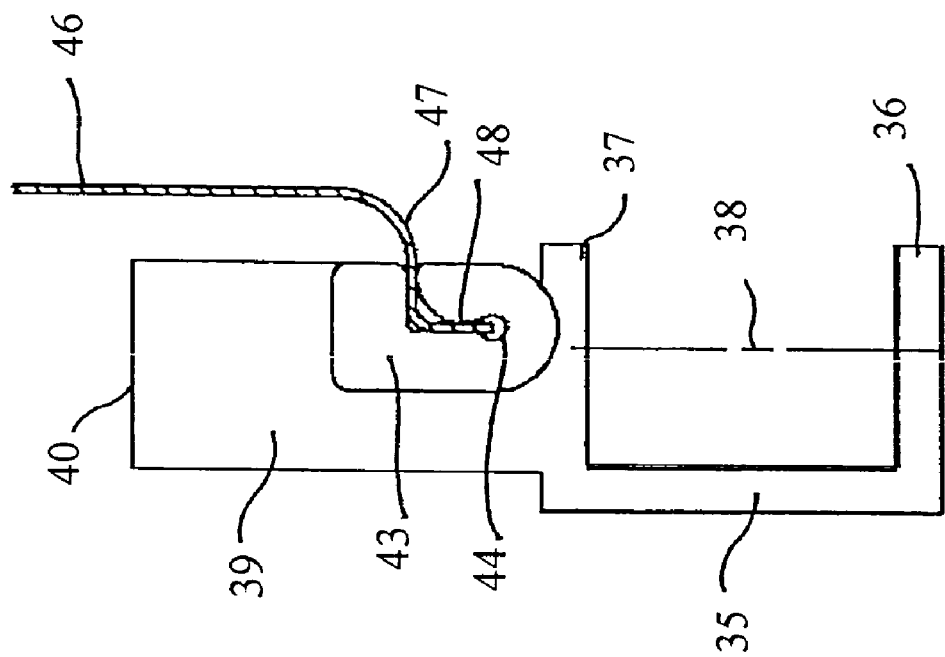
FIG. 6 shows a pivot bearing formed on the sliding element according to FIG. 3 in a schematic side view.

Guiding of sliding element 43 on guide flange 48 is shown enlarged in FIG. 6. According to FIG. 6, the door module support has a substantially vertical guide wall 46 which carries over into a curved area 47 and becomes guide flange 48 projecting substantially downwards which engages into guide slot 44 of sliding element 43. Overall sliding element 43 encompasses the bottom end area of the door module support with guide flange 48 preventing any play of sliding element 43 in the transverse direction of the vehicle. Sliding element 43 is rigidly connected to articulated joint 35 or formed thereon. Articulated joint 35 comprises two substantially horizontal, parallel guide surfaces 36, 37 at a distance from each other, between which the foremost chain link of the bottom cable drag chain is accommodated. The bottom cable drag chain is pivoted around vertical articulated axis or vertical pivot axis 38 as described above. On an appendage 39 of articulated joint 35 is formed a contact surface 40 on which the rearmost link of the top cable drag chain can bear on.

Figure 4:
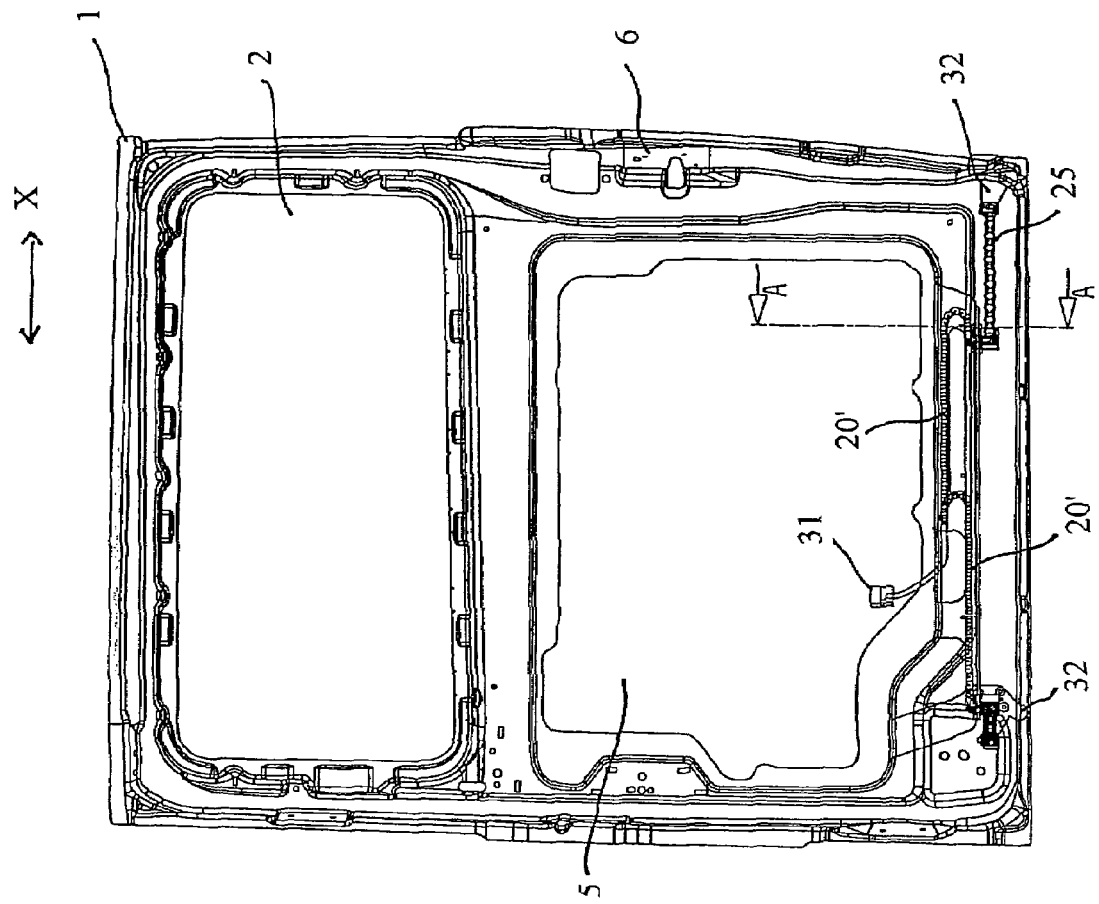
FIG. 4 shows the sliding door according to FIG. 1 in a schematic side view from inside.

FIG. 4 shows sliding door 1 according to FIG. 1 from the inside. The exact construction of the guide cavity will be described in greater detail in the following with reference to FIGS. 5a and 5b which show a cross-section along the line A-A according to FIG. 4 for a first (FIG. 5a) and a second (FIG. 5b) embodiment of the present invention.

According to FIG. 5a, chain links 21 of the top cable drag chain are guided in a cavity formed between inner door skin 4 and door module support 10. Laterally the guide cavity is limited by a substantially vertical guide wall 7 of inner door skin 4 and opposing, parallel guide wall 46 of door module support 10. Curved areas 45, 47 connect to the flat functional element support or the bottom guide flange of door module support 10.

According to FIG. 5b, chain links 21 of top cable drag chain 20 are guided in an oblong cavity which is limited laterally by a vertical guide wall of door module support 10 and a rear side of door inside trim 50.

According to a further embodiment (not shown), the chain links of the top cable drag chain are guided in an oblong cavity which is limited laterally by the substantially closed inner door skin and the door inside trim.

As will immediately be obvious to the person of average skill in the art, according to the invention the guide surfaces of the guide channel may generally be formed or integrated at least in sections on the inner door skin and/or on a door module support capable of being connected to the inner door skin and/or on the door inside trim.

To assemble the sliding door, first of all the cable guide assembly formed by cable drag chains 20, 25 and articulated joint 35 are attached to an appropriate door module support. The functional units provided on the door module support may be connected at the connecting plug of the cable guide assembly. Subsequently, the door module support is connected to the sliding door. According to the first embodiment, in this regard the cavity acting as the guide channel is automatically created between the inner door skin and the door module support. According to the second embodiment, the guide cavity is formed by installing a door inside trim. Installation of the door inside trim may take place prior to or following installation of the door module support.

By a method according to a further aspect of the present invention, the outer door skin, the inner door skin and the door inside trim are provided such that the guide surfaces of the guide channel on installing the sliding door are formed or integrated at least in sections on the inner door skin and/or on a door module support capable of being joined to the inner door skin and/or on the door inside trim.

Although not shown in the Figures, it will be obvious to the person of average skill in the art that the guide for guiding the cable guide assembly according to a further embodiment of the present invention can basically be integrated in the door module support with the result that side walls of the guide are formed in the door module support itself.

LIST OF REFERENCE NUMERALS

1 Sliding door
2 Window aperture
3 Outer door skin
4 Inner door skin
5 Cavity
6 Door lock
7 Guide wall
9 Seal 10 Door module support
11 Circumferential seal area
12 Flat functional element support
13 Bottom edge
14 Guide channel/guide area
15 Stamping
16 Stamped guide wall/cut-out
17 Top section of guide channel
18 Bottom section of guide channel
19 Cable drag chain turning area
20, 20' Top cable drag chain
21 Chain link of top cable drag chain
22 Round connecting protrusion
23 Receiving opening for connecting protrusion 22
24 Turning area
25, 25' Bottom cable drag chain
26 Chain link of bottom cable drag chain
27 Round connecting protrusion
28 Receiving aperture for connecting protrusion 27
30 Connecting cable on sliding door side
31 Connecting plug
32 Interface element on vehicle body side
33 Fixing element
35 Articulated joint
36 Bottom guide surface
37 Top guide surface
38 Articulated joint or pivot axis
39 Top appendage
40 Top contact surface
43 Sliding element
44 Guide slot
45 First curved area of door module 10
46 Vertical guide wall
47 Second curved area of door module 10
48 Guide flange
50 Door inside trim

The invention claimed is:

1. A sliding door for motor vehicles, having an outer door skin, an inner door skin and a door inside trim,
said sliding door being supported on at least one guide rail provided on a vehicle body and being movable between an opened position and a closed position along a longitudinal direction of the vehicle,
said sliding door comprising
a cable guide assembly for accommodating and guiding electric cables, which connect first electric elements provided in or on the vehicle body to second electric elements provided on the sliding door, and
a guide channel for guiding the cable guide assembly on moving the sliding door, said guide channel being formed as a cavity extending along the longitudinal direction of the vehicle with two side walls parallel to each other,
wherein said side walls of said guide channel are formed or integrated at least in sections on at least one of the inner door skin, a door module support capable of being connected with the inner door skin and the door inside trim to serve as guide surfaces for guiding said cable guide assembly,
wherein the cable guide assembly comprises a first and a second section, wherein
said first section is received and guided in said guide channel such that said first section can move only in the sliding plane including the longitudinal direction of the vehicle on moving the sliding door, and
said second section is disposed outside of said guide channel and is configured such that said second section is movable or pivotable in a direction transverse to the sliding plane on displacing the sliding door into the sliding plane, and wherein
said side walls of said guide channel limit a lateral movement of the first section of the cable guide assembly.

2. The sliding door according to claim 1, wherein an end of the cable guide assembly connected to an interface element on the door side is guided in a top guide section of the guide channel, and wherein an end of the cable guide assembly connected to an interface element on the vehicle body side is guided in a bottom guide section of the guide channel.

3. The sliding door according to claim 2, wherein on moving the sliding door a C-shaped turning area of the cable guide assembly, in which the direction in which said electric cables run, is reversed, passes over a central guide area which is provided between the top section and the bottom section of the guide channel.

4. The sliding door according to claim 3, wherein said cable guide assembly is configured such that said C-shaped turning area is formed in any position of said sliding door.

5. The sliding door according to claim 4, wherein said guide channel is configured at a front end and rear end respectively of said guide channel, if viewed in longitudinal direction of said vehicle, such that said C-shaped turning area is disposed outside of said guide channel or in a widened end area of said guide channel in the completely closed position and completely opened position of said sliding door respectively.

6. The sliding door according to claim 2, wherein a cross-sectional constriction is formed between said top portion and said bottom portion of said guide channel, said cross-sectional constriction projecting into said guide channel such that said C-shaped turning area of said cable guide assembly passes long over said cross-sectional constriction when said sliding door is moved.

7. The sliding door according to claim 6, wherein said guide channel is configured at a front end and rear end respectively of said guide channel, if viewed in longitudinal direction of said vehicle, such that said C-shaped turning area is disposed outside of said guide channel or in a widened end area of said guide channel in the completely closed position and completely opened position of said sliding door respectively.

8. The sliding door according to claim 1, wherein a width of the guide channel in the vicinity of the side walls corresponds to a transverse dimension of the cable guide assembly in the transverse direction of the vehicle.

9. The sliding door according to claim 1, wherein the guide channel further includes a sliding element guide for guiding a sliding element connected to the cable guide assembly.

10. The sliding door according to claim 9, wherein the sliding element guide is formed as a longitudinal protrusion on the guide channel, which engages in a longitudinal slot of the sliding element.

11. The sliding door according to claim 9, wherein a pivot bearing is formed on or attached to the sliding element, on which pivot bearing a second section of the cable guide assembly is pivotably supported so that the second section executes a pivoting movement around an axis perpendicular to the longitudinal direction of the vehicle when the sliding door is displaced into the sliding plane.

12. The sliding door according to claim 11, wherein the pivot bearing is designed to be C-shaped and in one piece with the sliding element.

13. The sliding door according to claim 1, wherein the guide channel is formed between the door module support and the inner door skin of the sliding door.

14. The sliding door according to claim 1, wherein the guide channel is formed between the door module support and the door inside trim of the sliding door.

15. The sliding door according to claim 1, wherein at least one side wall of the cavity forming said guide channel is formed on one of the door module support, the inner door skin and the door inside trim.

16. The sliding door according to claim 15, wherein the cavity is formed by working an edge area of one of the door module support, the inner door skin and the door inside trim.

17. The sliding door according to claim 16, wherein the at least one side wall is formed by stamping of the worked edge area of one of the door module support, the inner door skin and the door inside trim.

18. The sliding door according to claim 1, wherein the first and section of said cable guide assembly is formed as a cable drag chain consisting of a plurality of chain links, said electric cables being accommodated and guided within said cable drag chain.

19. A method of assembling the sliding door according to claim 1, said method comprising the steps of: providing the outer door skin, the inner door skin, the door module support, the door inside trim and the cable guide assembly;

assembling the sliding door with the door module support, the inner door skin and the door inside trim in such a manner that guide surfaces of the guide channel are formed or integrated at least in sections on at least one of the inner door skin, a door module support capable of being connected with the inner door skin and the door inside trim.

20. The method according to claim 19, wherein the cable guide assembly is provided pre-assembled and is attached to the door module support for accommodating the sliding door's functional units and wherein the door module support is attached together with the functional units and the cable guide assembly to the sliding door in such a manner that the guide channel for guiding the cable guide assembly is formed on moving the sliding door.

21. The method according to claim 19, wherein the guide channel is formed between the door module support and the inner door skin of the sliding door.

22. The method according to claim 19, wherein the guide channel is formed between the door module support and the door inside trim.

* * * * *